United States Patent [19]

Chabot

[11] Patent Number: 4,810,213
[45] Date of Patent: Mar. 7, 1989

[54] LOW RESISTANCE ELECTRICAL CONNECTING ASSEMBLY

[75] Inventor: Ferdinand E. Chabot, Cedar Rapids, Iowa

[73] Assignee: Square D Company, Palatine, Ill.

[21] Appl. No.: 200,814

[22] Filed: Oct. 27, 1980

Related U.S. Application Data

[63] Continuation of Ser. No. 968,547, Dec. 8, 1978, abandoned, which is a continuation of Ser. No. 868,565, Jan. 10, 1978, abandoned, which is a continuation-in-part of Ser. No. 759,683, Jan. 17, 1977, abandoned, which is a continuation of Ser. No. 716,330, Aug. 20, 1976, abandoned, which is a continuation of Ser. No. 672,368, Mar. 31, 1976, abandoned, which is a continuation of Ser. No. 545,461, Jan. 30, 1975, abandoned.

[51] Int. Cl.⁴ .............................................. H01R 13/34
[52] U.S. Cl. ..................................... 439/825; 439/840
[58] Field of Search ...................... 339/9, 17, 114, 115, 339/252, 255, 256, 254, 278 C, 278 D; 174/99 E; 200/252, 276

[56] References Cited

U.S. PATENT DOCUMENTS

| 607,760 | 11/1960 | Arnott, Jr. | 339/115 R |
|---|---|---|---|
| 2,539,230 | 1/1951 | Craig | 339/278 C |
| 2,678,428 | 5/1954 | Fiet | 339/256 R T |
| 2,846,649 | 8/1958 | Hornauer | 339/278 C |
| 2,882,514 | 4/1959 | Krantz | 339/256 S |
| 3,056,101 | 9/1962 | Bethke | 339/255 R T |
| 3,396,257 | 8/1968 | Vazquez | 200/276 |
| 3,818,421 | 6/1974 | Krager | 339/177 R |

FOREIGN PATENT DOCUMENTS

| 1440782 | 12/1968 | Fed. Rep. of Germany | 339/256 S |
|---|---|---|---|
| 1274739 | 9/1961 | France | 339/256 S |
| 29822 | of 1914 | United Kingdom | 339/256 S |
| 1126984 | 9/1968 | United Kingdom | 339/256 S |

Primary Examiner—Joseph H. McGlynn
Attorney, Agent, or Firm—Larry I. Golden; Richard T. Guttman; Norton Lesser

[57] ABSTRACT

A low resistance electrical connecting assembly, each assembly including a plurality of operably arranged conductive elements, each element comprising a pair of relatively narrow, thin, outwardly convex, conducting contact surfaces supported on opposite sides of a latitudinal plane between them. The outwardly convex contact surfaces of each element are conductively associated to provide parallel current paths between source-side and load-side conductors in contact respectivley with opposite ones of said conductive surfaces of each element. Such elements may be embodied in the form of a helical coil of conductive wire, each ring of the coil constituting one element. Another embodiment may be individual disks of conductive metal arranged in stacking relationship. Any number of other embodiments are possible which provide a plurality of elements as described, thin, outwardly convex conductive surfaces on opposite sides of a latitudinal plane, in closely adjacent side by side arrangement.

9 Claims, 4 Drawing Sheets

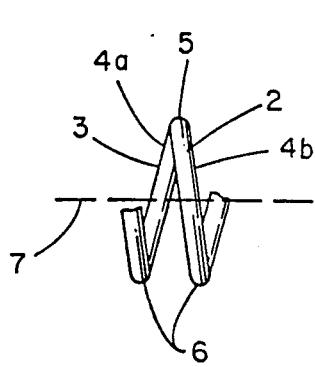
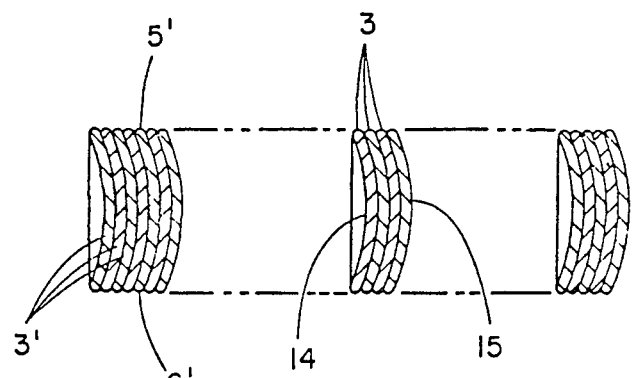
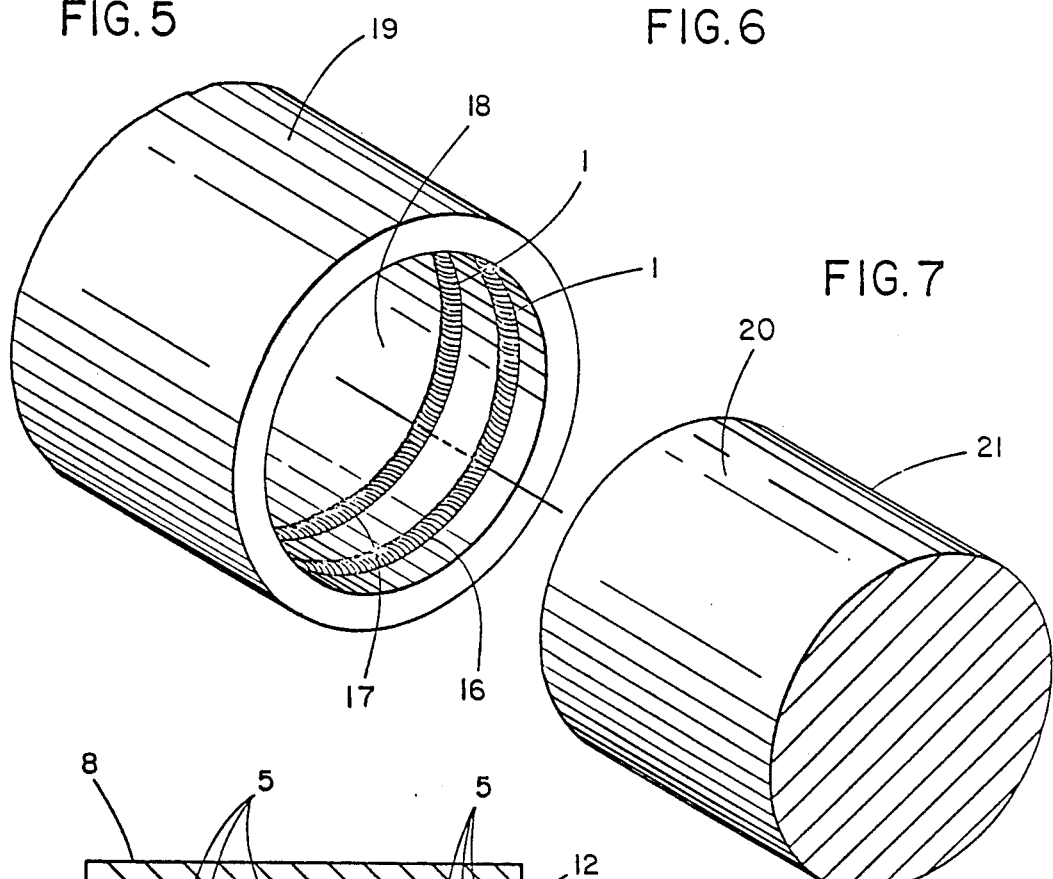
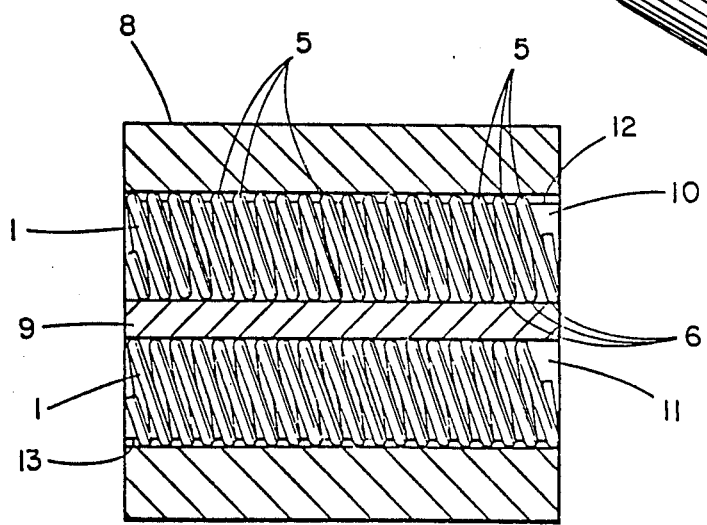

LOW RESISTANCE ELECTRICAL CONNECTING ASSEMBLY

CROSS-REFERENCE TO RELATED APPLICATIONS

The present application is a continuation of application Ser. No. 968,547 filed Dec. 8, 1978, now abandoned, which is a continuation of application Ser. No. 868,565 filed Jan. 10, 1978, now abandoned, which is a continuation-in-part of application Ser. No. 759,683 filed Jan. 17, 1977, now abandoned which is a continuation of application Ser. No. 716,330, filed Aug. 20, 1976, now abandoned, which is a continuation of Ser. No. 672,368, filed Mar. 31, 1976, now abandoned, which in turn is a continuation of parent application Ser. No. 545,461, filed Jan. 30, 1975, now abandoned.

BACKGROUND OF THE INVENTION

1. Field of the Invention

This invention relates to an assembly providing low resistance connections between electrical conductors and more particularly to an improved assembly for establishing a low resistance connection between conductors adapted to carry high current.

2. Description of the Prior Art

Connections between conductors carrying high currents such as 400 amps and above are subject to blow apart forces due to constricting current paths and opposing large magnetic fields.

Various attempts have been made to improve such connections and reduce resistance as well as blow apart forces. One approach in avoiding the blow apart forces at the connection utilizes a jawlike assembly with one end of the assembly secured to opposite sides of a bus bar and the other end projecting forwardly to receive therebetween another bus bar. The jaw members are biased together by heavy springs to hold them tightly against the connected bus bars and to resist the blow apart forces. The contact surfaces of each jaw member at the point of contact with each bus bar may be rounded to make the contact angle of current flow less acute which will tend to lessen blow apart forces. However, portions of such connecting jaws are still substantially parallel to both the source-side and load side bus bars and in relatively close proximity so magnetic fields of current paths in such connecting jaws and parallel bus bars still create substantial blow apart force. The aforementioned arrangement is also quite expensive, and imperfections in the engaged surfaces give rise to poor or high resistance contact and heating effects.

Arrangements to secure multiple current paths between associated conductors have used helical or coil springs. The turns of the springs provide a multiplicity of engaged surfaces acting in parallel which are free to adjust themselves independently to make good contact. This approach, as set out in British Pat. No. 29,822, uses a hard drawn copper or phosphor bronze helical coil with the turns set at an angle of 60° to 80° from the axis of the helix to the points of engagement or contact. This angle can provide high resistance to insertion or connecting forces, and phosphor bronze is inherently a high electrical resistance material with conductivity usually in the neighborhood of 18% of that of copper.

Copper on the other hand, while providing low resistivity does not generally retain its resiliency in high heat environments, such as that occurring in high current connections adapted to carry 400 amps or more. Temperatures in such environments may be maintained at 100° C. and may reach a maximum transient temperature of 150° C. for a 30 cps current.

It has therefore not been previously proposed to utilize a coil spring to establish connections between conductors adapted to carry currents of 400 amps or more.

SUMMARY OF THE INVENTION

This invention utilizes a coil spring for establishing low resistance connections between conductors adapted to carry currents of 400 amps or more. The problem of high insertion forces is avoided by substantially decreasing the angle between the turns of the spring and the axis of the helix or coil and by utilizing a joint compound and an angle of less than 50°. This angle is preferably chosen as 45° and a coil-holding-trough is provided in one of the conductors, which ensures two points of engagement for the spring with the conductor.

The spring is silver plated and fabricated from a copper cadmium 162 alloy. This arrangement provides 82% IACS or copper conductivity, whereas only 60% is required, and retains its elasticity under the required conditions.

It is, accordingly, among the various objects of this invention to provide a more reliable low resistance arrangement to electrically connect a supply-side conductor and a load-side conductor adapted to carry 400 or more amperes.

It is a further object of this invention to provide an improved low resistance electrical connection capable of withstanding a transient maximum temperature of 150° C. for ½ second and a maintained temperature of 100° C.

A still further object of this invention is to provide an improved, effective and economical method of maintaining the coil contact of the electrical connector in position.

Another and further object of this invention is to provide an improved low resistance electrical connection assembly capable of withstanding repeated connections with minimum force required for establishing the connection.

Still other objects include minimal chemical attack on contact surfaces and enhances thermal conduction. Further objects and advantages will become apparent from the following specification and drawings together with the claims.

BRIEF DESCRIPTION OF THE DRAWINGS

FIG. 5 is a side elevation view of one ring element of the low resistance helical coil shown in FIG. 1 with the respective adjacent ring elements on each side being broken away.

FIG. 6 is a side elevation view of the conductive discs shown in FIG. 4.

FIG. 7 is an exploded perspective view of helical coils embodying this invention shown seated in a round socket conducting member of a plug-in connection.

FIG. 8 is a section taken on line 8—8 of FIG. 3.

DESCRIPTION OF PREFERRED EMBODIMENT

Figure 1:
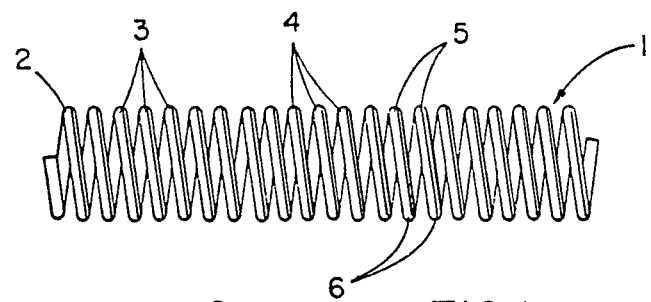
FIG. 1 is a side elevational view of one embodiment of this invention in the form of a helical coil of conductive wire.

A low resistance electrical connecting device in accordance with this invention may be embodied in the form of a helical coil 1 of conductive wire 2 such as copper cadmium. The wire should be at least 60% IACS. It may be relatively thin and is preferably silver plated for improved conductivity. The rings 3 of the coil 1 are arranged so close together in this invention, and the diameter of the coil is sufficiently small, whereby sufficient support and rigidity is provided for the coil.

Each ring 3 of helical coil 1 comprises one conductive element 4 in accordance with this invention. The invention is described as being embodied in a helical coil for convenience of description, but the invention may be embodied in a wide variety of resilient elements of suitable conductivity.

Each conductive element 4 includes a pair of outwardly convex surfaces 5 and 6, each supported on opposite sides of an equatorial or latitudinal plane 7 between them as illustrated in FIG. 5. The plane between convex surfaces 5 and 6 may be at the equator dividing each into equal halves, but it need not be. It may be any latitudinal plane having some part of an outwardly convex surface on each opposite side of the plane. The poles of such spherical or convex surfaces 5 and 6 on opposite sides of such plane need not be axially aligned. They may be axially offset, or their axis may be randomly directed, but they are preferably conductively associated to provide parallel current paths between a source-side conductor 8 in contact with one set of said convex surfaces 5 and a load-side conductor 9 in contact with the opposite set of convex surfaces 6.

In the helical coil embodiment of this invention, the convex surfaces 5 and 6 are conductively associated to provide parallel current paths through the oppositely directed sides 4a and 4b of each ring 3 of the helical coil.

Figure 3:
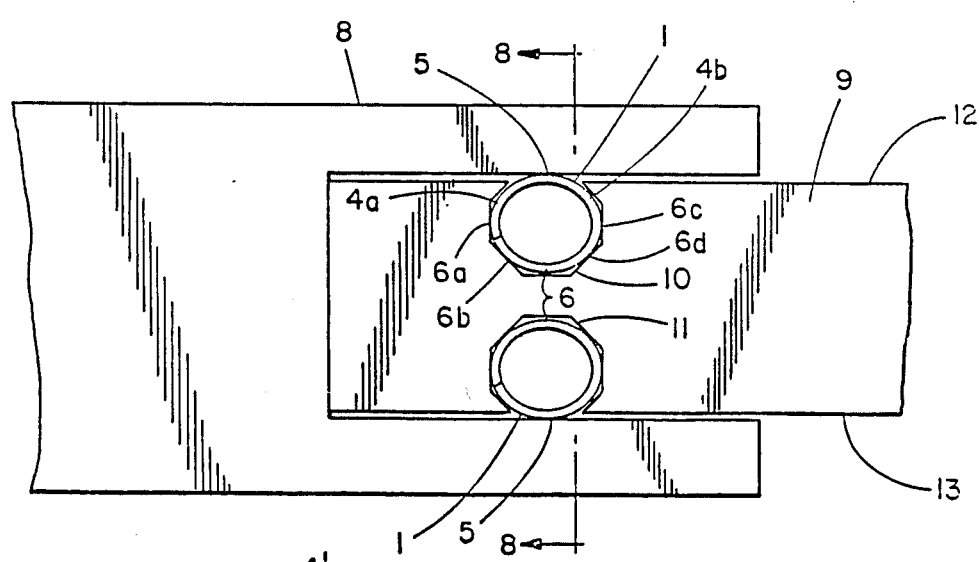
FIG. 3 is a side elevation view of the bus bar and an end view of the conductive helical coil shown in FIG. 2 with a second bus bar shown in connected contacting relationship therewith.

As illustrated in FIG. 3, one side 4a of a ring of the coil 1 provides one conductive path between a point where convex surface 5 contacts source-side bus bar 8 and the points where convex surface 6 contacts load-side bus bar 9 at 6b.

The opposite side 4b of the coil ring provides an electrically parallel current path between the point where convex surface 5 contacts source-side bus bar 8 and the point 6d of convex surface 6 in contact with load-side bus bar 9.

Thus a current path from bus bar 8, convex surface 5, conductive path 4a, contact point 6a and bus bar 9 is electrically in parallel with a current path from bus bar 8, convex surface 5, conductive path 4b, contact point 6c and bus bar 9.

The conductive coils 1 may be seated in transverse recesses 10 and 11 formed in opposite sides of bus bar 9 opening to respective surfaces 12 and 13. In this embodiment convex surfaces 5 protruding outwardly from surfaces 12 and 13 respectively are proportionately smaller than their corresponding convex surfaces 6 lying on the opposite side of respective planes through coils 1 which are co-planar with respective surfaces 12 and 13 of bus bar 9.

The coils 1 are preferably seated in recesses 10 and 11 with their rings 3 inclined in side elevation with respect to the surfaces 12 and 13 of bus bar 9. This arrangement tends to put the rings of the coil under a certain amount of tension or tortional stress for better contact with the respective bus bars 8 and 9.

The width of the recesses 10 and 11 corresponds to the circumferential dimension of helical coils 1 to retain them snugly therein. The depth of the recesses is less than the diameter of the coils 1 whereby the convex surfaces 5 of each of the coil rings 3 protrude outwardly from the surfaces 12 and 13 of bus bar 9.

The cross-sectional configuration of recesses 10 and 11 may be polygonal as shown, rectangular, square, ovular or circular, as long as they retain the helical coils snugly therein with a convex surface 5 projecting outwardly from the surfaces of the bus bar.

Figure 2:
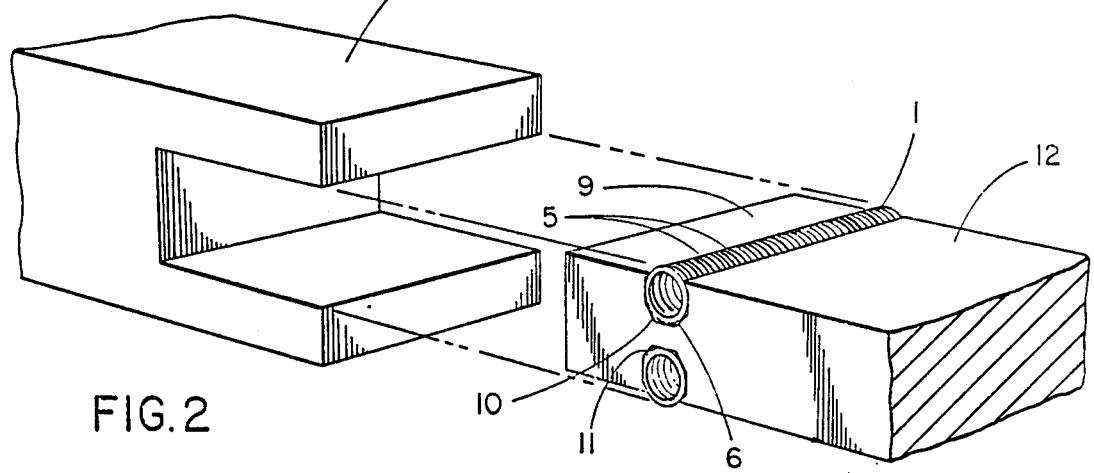
FIG. 2 is an exploded perspective view of a bus bar having conductive helical coils as shown in FIG. 1 restrainingly seated transversely thereon on opposite sides with portions projecting outwardly from the contact surfaces of the bus bar for contact with another conductor.

Only one helical coil 1 is shown recessed in each opposite side of bus bar 9, in FIG. 2, but a plurality of recesses and coils can be provided in each side of the bus bar througout its area which is in facing relation to a corresponding connected bus bar.

Figure 4:
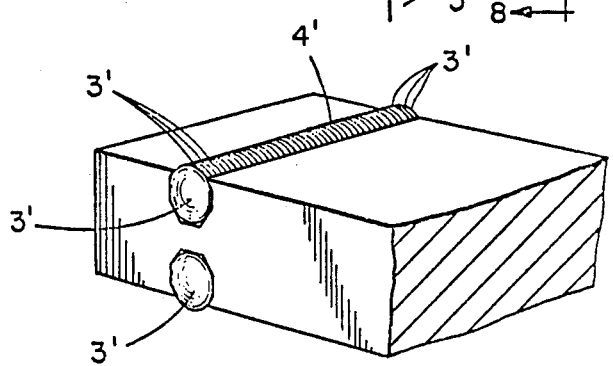
FIG. 4 is a perspective view of a modified form of the low resistance connecting device in accordance with this invention, comprising axially aligned conductive discs in nested relationship to each other and restrainingly seated transversely in a bus bar with a surface portion of each disc projecting outwardly from the contact surface of the bus bar for contact with another conductor.

A modified embodiment of this invention is illustrated in FIGS. 4 and 6. In this embodiment each conductive element 4' consists of an individual separate disk 3' is in nested engagement and capable of flexure in response to engagement by a planar surface of another conductor and, preferably silver plated. The flexure may be provided by a bend in an equatorial plane to enable resilient engagement with the other conductor. The disks may be in any of a variety of disk shapes, the only requirements being that they have outwardly convex rim surfaces 5' and 6' on opposite sides of a latitudinal plane between such surfaces, and the disks should be relatively thin in cross-section to enable stacking a large number closely adjacent to each other to provide many contact points and current paths for a given area of conductors with which they are used.

The disks 3' may be concave-convex with concave and convex side walls 14 and 15, respectively, for stacking in a nesting relationship as illustrated in FIG. 6. Each disk may touch adjacent disks or they may be slightly spaced apart.

Any number of other structural forms may be utilized to embody this invention as long as they provide a multiplicity of outwardly convex conductive surfaces on opposite sides of a latitudinal plane between them and with the oppositely disposed convex surfaces conductively associated to provide parallel current paths.

Figure 10:
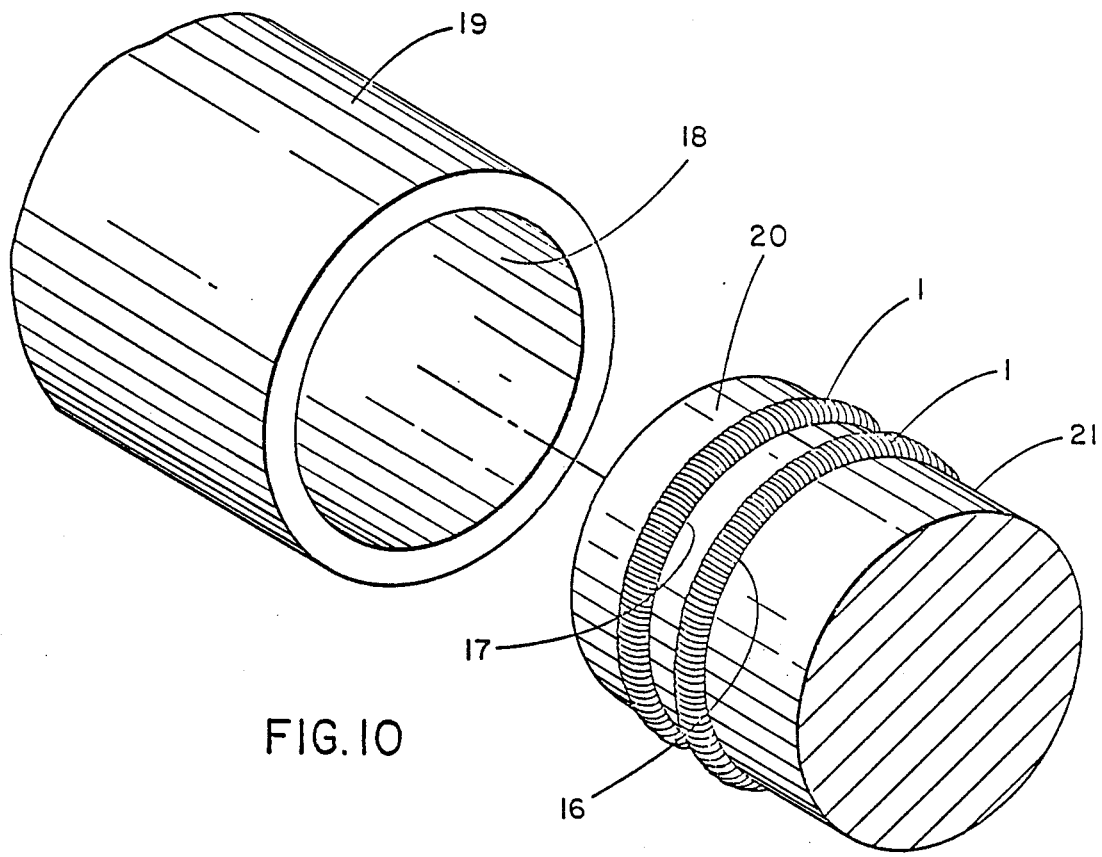
FIG. 10 is an exploded perspective view of helical coils embodying this invention shown seated in recesses formed around the circumference of a plug member of a plug-in type connection.

The structural embodiment of this invention is preferably small in size relative to current carrying capacity, and easily adapted for mounting across corresponding connecting surfaces of respective source-side and load-side conductors. FIG. 7 illustrates a helical coil embodiment of this invention for use in a plug and socket type of connection. Two helical coils 1 are shown seated in annular recesses 16 and 17 formed in the inner conductive wall 18 of socket 19. Only one coil 1 in one recess 16 may be used, or a plurality of coils and recesses as shown. The width of recesses 16 and 17 corresponds to the circumference of helical coils 1 to retain them snugly therein. The depth of the recesses is less than the diameter of helical coils 1 whereby the convex surfaces 5 of each of said coil rings 3 protrudes from the surface of inner conductive 18 for contact with surface 20 of plug conductor 21. FIG. 10 illustrates a plug and socket connection having the helical coils 1 mounted on the plug conductor 21.

Since this invention includes a multiplicity of closely adjacent individual elements each providing parallel current paths, and minimal surface contact of the part of each element for highly efficient low resistance transfer of current from one conductor or another, it is particularly useful in electrically connecting conductors having irregular surface shapes and contours.

Figure 9:
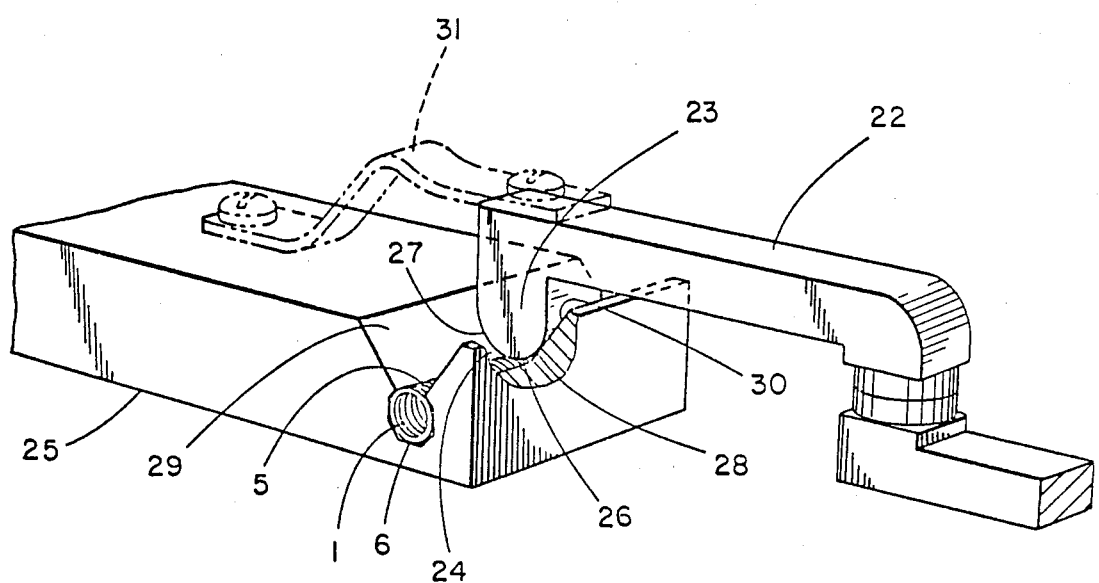
FIG. 9 is a perspective view of a conductive contact arm of a circuit breaker having a pivot end seated in a bus bar of the circuit breaker, and a helical coil of conductive wire in accordance with this invention seated in a recess of the bus bar.

FIG. 9 illustrates one application of this type, involving a movable contact arm 22 of a circuit breaker having a pivot end seated in V-shaped recess 24 of conductor 25. A small helical coil 1 in accordance with this invention, of preferably silver plated wire, is seated in the vertex of V-shaped recess 24. Outwardly convex surfaces 5 project into the cavity of recess 24 for contact with the rounded surface edge 26 of the pivot end 23 of contact arm 22. The opposite outwardly convex surfaces 6 are in contact with conductor 25. Prior to this invention, each contact arm in this type of circuit breaker had only two contact points at 27 and 28 along the respective side walls 29 and 30 of the V-shaped recess 24. These were insufficient when current increased beyond a given point to transfer the entire current between conductor 25 and contact arm 22, and to prevent the pivot end 23 from "popping" out of recess 24 due to blow apart forces. A shunting conductor 31 had to be provided for such increased current to prevent popping. The low resistance connecting device comprising helical coil 1 seated in recess 24 for contact between conductor 25 and contact arm 22 is able to transfer such increased current without the need of a shunting conductor 31.

The connecting elements and assembly in accordance with this invention may be embodied in a variety of different structures using a variety of different conductive materials, as long as the structure provides multiple parallel current paths between a source-side conductor and a load-side conductor.

Preferable specifications for the conductive material, whether it be a single element metal or an alloy, are (1) electrical conductivity with a resistivity no greater than 1.12 microhms - centimeter at 20° Centrigrade, and (2) structural strength or stiffness equal to or greater than the modulus of rigidity of copper, or alternatively a modulus of rigidity equal to or greater than $15.0 \times 10^6$ pounds per square inch.

A preferred conductive material for use in this invention is copper which may be silver plated for better conductivity. Illustrative examples of other conductive materials that would be suitable are alloys of beryllium copper, phosphor bronze and aluminum. Illustrative examples of other plating materials which would be suitable for use with this invention include tin plating and cadmium plating.

Figure 11:
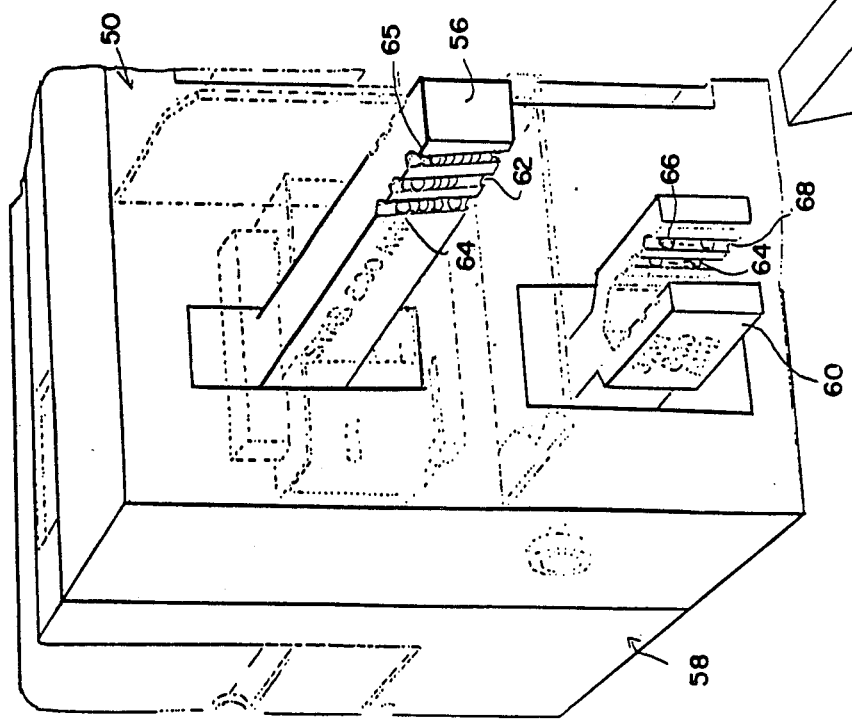
FIG. 11 is a generally schematic isometric view of an embodiment of the invention utilized in a high current application.

In FIG. 11 a portion of a plug-in or switchboard unit 50 is schematically illustrated for extending a connection from a line terminal 52 to a load terminal 54. The line terminal 52 extends from a bus bar, for example, and typically may carry 400, 800 or 1200 amperes and is connected to a conductor or stab 56 projecting from the unit 50 in response to movement of the unit 50 toward the terminal 52. The stab 56 in turn extends a connection from the terminal 52 through a circuit breaker or switch generally indicated at 58 of the plug-in unit to a conductor or jaw 60 adapted to receive the stab or load terminal 54 for extending power to a load.

The line terminal 52 comprises a jaw or a pair of spaced legs having spaced planar surfaces adapted to receive the spaced planar surfaces of stab 56 therebetween. Each surface of stab 56 contains a plurality of elongated channels, troughs or recesses 62 extending transverse at an outer angle to the direction of movement between the stab 56 and terminal 52. Each recess retains a respective coil spring 64 for engaging the surfaces of terminal 52. A crimp 65 in the recess edge adjacent each end of a respective coil spring limits longitudinal movement of the spring.

The load terminal 54 comprises a parallelepiped stab whose forward or engagement end is bevelled to in turn bevel the ends of the opposing or spaced parallel surfaces of terminal 54 for sequentially engaging the coils or turns 66 of a coil spring 64 carried in a respective one of a plurality of recesses 68 of jaw 60. Contact between stab 54 and coils 66 is therefore gradual and limits the total force necessary for engagement in a manner similar to that between springs 64 carried by stab 56 and terminal 52.

Figure 13:
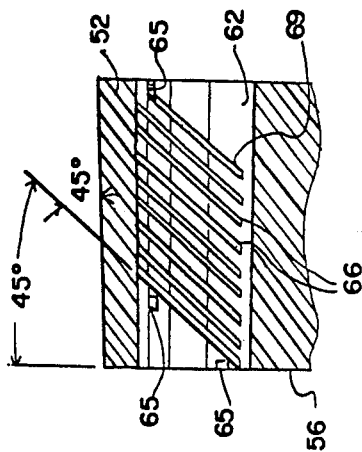
FIG. 13 is a longitudinal sectional view of a recess and coil.
Figure 12:
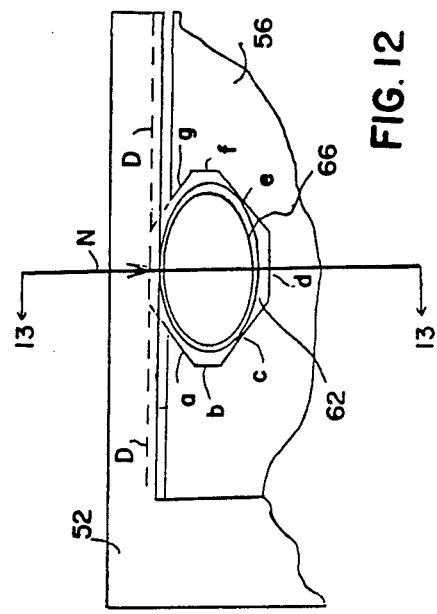
FIG. 12 is a sectional view taken through a spring recess.

Each trough as seen in FIG. 12 is polygonally shaped having sides a–g with relatively short sides b and f and the recess extends substantially 270° about each spring to define an opening communicating with the adjacent planar surface. It will be noted that the recess 62 has a polygonal cross section including side surface portions b and f spaced apart a greater distance than the longitudinally extending edges defining the opening between recess 62 and the planar surface portions to form an undercut for the recess. The side surface portions b and f each connect to a respective lower bottom or tangent surface portion c and e extending toward each other and from the recess opening. The opening permits the spring to extend or project above the respective planar surface for substantially 0.03". As can be seen in FIG. 13, the conductive coils are positioned in the trough so that the coil turns are at an angle less than 50° from the axis of the coil or adjacent planar surfaces and preferably 45° as shown. This angle is of critical importance as it reduces the force necessary to secure engagement between the coils and the mating surfaces, while retaining the necessary resilient engagement between the opposing or mating conductors to ensure uniform multiple current paths.

FIG. 12 shows the two points of contact or tangency between each turn of conductive coil 64 and the surface of trough 62, as occurs during engagement with a mating surface. One point of contact along side c is coincident with a tangent point on end surface a of the recess opening and the other contact point along side e is coincident with a tangent point on end surface g of the recess opening with the pair of end surface portions a and g defining the recess opening with the pair of end surface portions a and g defining the opening through which the spring projects. Each tangent point or position on surfaces c and e is spaced less than the diameter of the spring from a tangent point or position on the end surfaces a and g as seen in FIG. 12 and each tangent point of surfaces c and e is at substantially 135° to a normal N between a mating surface of terminals 52 or 54 and the respective turn to permit facile deformation of the coil in the directions of sides b, d and f, as the forces of engagement between the spring and the mating conductor are exerted at two positions as indicated by c and e. The spacing between surfaces c and a and between surfaces e and g respectively therefore correspond to the spacing between tangent positions a and g in order to provide the preferred angle of 45°.

When the terminals 52 or 54 are disengaged from the respective spring the turns expand so that they are also tangent to the surfaces a and g terminate substantially at a respective point of tangency with the spring to permit the spring to project from the recess 62, however in fabrication the surfaces a and g initially extend beyond the point of tangency as shown by dotted lines D and are machined off, since the conductors or terminals are generally formed from extruded aluminum and cannot be accurately extruded to the desired dimension.

The coils have an outer diameter of substantially 0.250" and are formed from cadmium copper alloy 162 wire of 0.02" diameter. This wire has a resistance of less than 50 microhms per inch. With 25 turns per inch and peak currents of 20 kiloamps per inch can be safely carried. A silver plate of 0.00025" minimum is applied to the wire and a similar plate is applied to the planar terminal surfaces. The cadmium copper alloy has a conductivity of substantially 82% of IACS and should not be less than 60% IACS for use in the described arrangement. This spring arrangement retains its resiliency or elasticity at maximum transient temperatures of 150° C. for 30 cps or at continuous temperatures of 100° C.

In addition a joint compound such as Cu-AlAid or Ho-Oxid, or petroleum base compounds are provided on the springs and/or adjacent surfaces to reduce friction and to protect against chemical attack such as sulfides on the silver plate, or oxidation and to enhance thermal conductivity. The compound is typically a semi-liquid, insulative compound which is either organic or silicone based.

To extend a connection from the line terminal 52 to the load terminal 54, the plug-on unit 50 is moved relative the terminals to engage the stab 56 between the spaced planar surfaces of terminal 52 and the stab 54 is moved between the spaced planar surfaces of terminal 60. As the planar surfaces move into overlapping positions, the terminal 52 sequentially engages the turns of coil 64 since the axis of the coils are positioned at an acute angle to the direction of movement. This in conjunction with the angle of 45° between the plane of the coil turns and their axis or the planar surface and the joint compound substantially reduces the force required for engagement and facilitates repetitive engagement with minimum danger of damage. A similar result is achieved by the beveled end of stab 54 engaging the coil turns in sequence.

As the planar surfaces of terminals 52 and 54 engage the projecting springs the spring turns are compressed into the respective recesses and the angle to the axis tends to be reduced below 45° as the turns both slide relative each other and deform into the recess. The spring turns move from engagement with surfaces a and g and are held tightly engaged under spring pressure between surfaces c and e and the planar surface of the mating terminal. The springs in this arrangement provide substantially equal engagement pressure at all points to ensure multiple paths for current flow irrespective of tolerance problems or minor differences in the spacing of the planar surfaces.

The foregoing is a description of the preferred embodiments and the inventive concepts are believed set forth in the accompanying claims.

What I claim is:

1. An assembly for use in establishing a low resistance electrical connection comprising:

a pair of conductors each sized to carry either 400 amperes or more amperes of electrical current with each conductor having a planar surface and movable relative to each other in a first direction parallel to each planar surface to place said surfaces in overlapping positions, the planar surface of one conductor of said pair of conductors defining a surface plane and having an elongate recess extending in a direction transverse to said first direction and having a bottom surface in said recess defining a bottom plane, said recess having longitudinal edges located in said surface plane and extending transverse to said first direction to define an opening communicating with the respective planar surface of said one conductor, a helical coil spring formed of a copper cadmium alloy having a conductivity of at least 60% of that of pure copper adapted to remain resilient at a continuous temperature of at least 100° C. located in said recess with each turn of said spring having an arcuate periphery formed about an axis of rotation located in said recess and having a diameter, said diameter being greater than the distance between said longitudinal edges and greater than the distance between said surface plane and said bottom plane, each turn of said spring located in a plane having an angle of less than 50° to said surface plane, each periphery projecting from said recess through said opening to a respective position spaced from the planar surface of said one conductor, spacing means for spacing the planar surfaces of said conductors apart by a distance less than the distance the projecting periphery of each turn projects from the planar surface of said one conductor whereby each turn is engaged by the planar surface of the other conductor along the arcuate periphery faciley deflecting each said periphery toward said surface plane to establish an electrical connection between said conductors in response to the relative movement between said conductors in said first direction to place said surfaces in said overlapping positions, and a petroleum based joint compound on each planar surface and on the arcuate periphery of the turns of said spring.

2. A low resistance electrical connecting assembly as set forth in claim 1 wherein said spring and said planar surfaces are each silver plated.

3. An assembly as claimed in claim 1 wherein the edges of said elongate recess are crimped adjacent opposite ends of said spring to limit the longitudinal movement of said spring.

4. The assembly claimed in claim 1 in which a plurality of recesses are provided each having an elongate axis extending at an acute angle to said first direction.

5. The assembly as claimed in claim 1 in which one end of said other conductor is bevelled to engage each turn of a respective spring in sequence.

6. An assembly as claimed in claim 1 wherein said recess extends at least 180° about said spring and is tangent to said spring at two spaced positions, said recess having a polygonal shape in cross section including spaced apart side surface portions spaced apart a greater distance than said longitudinal edges to form an undercut portion for said recess with said side surface portions each overlapped by a respective portion of the planar surface of the one conductor, and two lower surface portions, each lower surface portion connecting a respective side surface portion with said bottom surface, each lower surface portion projecting from a respective side surface portion toward said other lower surface portion and in a direction away from said opening to tangentially engage each turn of said spring at a respective spaced position with each turn located in a plane having an angle of less than 50° to said first direction, said longitudinal edges extending perpendicular to said direction of relative movement to enable simultaneous engagement of each turn with the planar surface of said other conductor in response to said relative movement in said one direction to place said surfaces in said overlapping positions.

7. The assembly claimed in claim 6 in which said spaced positions are substantially 135° to a line normal to said spring and the engaged planar surface.

8. The assembly as claimed in claim 6 wherein said one conductor has a plurality of spaced planar surfaces each having a plurality of recesses extending transverse to said one direction with each recess having a spring projecting therefrom and said other conductor has a planar surface for overlapping a respective one of said plurality of spaced planar surfaces of said one conductor and wherein each turn of each spring projects substantially 0.03" from the respective recess for engagement with a respective planar surface of said other conductor and each spring has an outer diameter of substantially 0.025" and is formed from wire of substantially 0.02" diameter with each spring having substantially 0.25 turns per inch and said wire has a resistance of 25 microhms per inch.

9. An assembly for use in establishing a low resistance electrical connection comprising:
   a pair of conductors each sized to carry either 400 amperes or more amperes of electrical current with each conductor having a planar surface and movable relative each other in a first direction parallel to each planar surface to place said surfaces in overlapping positions, the planar surfaces of one conductor of said pair of conductors defining a surface plane and having an elongate recess extending in a direction transverse to said first direction and having a bottom surface in said recess defining a bottom plane, said recess having longitudinal edges located in said surface plane and extending transverse to said first direction to define an opening communicating with the respective planar surface of said one conductor,
   a helical coil spring formed of a copper cadmium alloy having a conductivity of at least 60% of that of pure copper adapted to remain resilient at a continuous temperature of at least 100° C. located in said recess with each turn of said spring having an arcuate periphery formed about an axis of rotation located in said recess and having a diameter, said diameter being greater than the distance between said longitudinal edges and greater than the distance between said surface plane and said bottom plane, each turn of said spring located in a plane having an angle of less than 50° to said surface plane, each periphery projecting from said recess through said opening to a respective position spaced from the planar surface of said one conductor,
   spacing means for spacing the planar surfaces of said conductors apart by a distance less than the distance the projecting periphery of each turn projects from the planar surface of said one conductor whereby each turn is engaged by the planar surface of the other conductor along the arcuate periphery faciley deflecting each said periphery toward said surface plane to establish an electrical connection between said conductors in response to the relative movement between said conductors in said first direction to place said surfaces in said overlapping positions,
   and a semi-liquid, insulative joint compound on each planar surface and on the arcuate periphery of the turns of said spring.

* * * * *